United States Patent Office 3,200,008
Patented Aug. 10, 1965

3,200,008
RESIN IMPREGNATED PAPERS
Rosemarie Holtschmidt and Ulrich Holtschmidt, both of Essen-Heisingen, Germany, assignors to Th. Goldschmidt A.-G., Essen, Germany
No Drawing. Filed Mar. 23, 1962, Ser. No. 182,114
13 Claims. (Cl. 117—155)

This invention generally relates to resin impregnated paper and the like carriers suitable as surface coatings and for the production of laminated products, and is particularly directed to novel resin impregnated carriers wherein the impregnating resin partially consists of a curable formaldehyde condensation resin and partially of a curable polymerization resin. The invention is also concerned with a process for producing the novel resin impregnated carriers.

The term "carrier" as used in this application is deemed to connote porous absorbent material such as paper and the like cellulose material.

It is well known that synthetic resin impregnated paper products are widely used in the production of laminates and for the purpose of improving the surface characteristics of panels, boards and the like. Such resin impregnated carriers usually consist of paper which is soaked or impregnated with a light-fast, colorless or lightly colored synthetic resin. The paper base is usually in the form of a high quality cellulose paper which is either white, colored or pigmented. In some instances, the paper is provided with a decorative or ornamental surface printing. As, from a practical point of view, the resin impregnated carrier has to be further processed, that is, has to be applied under pressure to a base such as a wooden board or has to fuse with other layers for laminate formation, the resin used for the impregnation must be of a kind which permits control and interruption of the hardening and curing procedure. In other words, the resin of the resin impregnated carrier, after the formation of the film, should not be in fully cured or hardened condition, as otherwise no further bonding to a base or another layer could be readily accomplished. For this reason, only a very selected number of synthetic resins can be employed for the purpose in question. From a practical point of view, resins have hitherto been used whose hardening can be readily interrupted at will and which, in semi or partially hardened condition, can be stored and shipped without endangering the success of the final bonding procedure. Thus, the resin impregnated papers available on the market are in semi-cured or hardened condition and final curing or hardening is performed only at the site of the consumer, that is, for example, when the film is applied to a board or panel under pressure and heat.

For the reasons advanced, only a small number of synthetic resins have been found to have characteristics which make them suitable for the impregnation of paper. The most popular synthetic resins used for the purpose referred to are formaldehyde condensation resins. Of this group, aminoplast resins are particularly suitable due to their transparency and fastness to light. Of the aminoplasts, in turn, the melamine resins in unmodified or modified form have found particular acceptance by the industry. This is so because melamine resins have the important advantage that the impregnation of the paper can be performed with aqueous or substantially aqueous solutions of the melamine resins. Further, melamine resins have considerable affinity to cellulose and moreover the finally hardened impregnated papers have superior mechanical and chemical characteristics. Some of the melamine resins, after final curing, also exhibit great thermal stability within certain limits.

In addition to the formaldehyde condensation resins referred to, certain curable polymerization resins have also been used for the production of resin impregnated papers. The polymerization resins which have been employed for this purpose are generally polymerizates of ester group containing systems having several unsaturated bonds. Thus, the so-called unsaturated polyesters and particularly the esters of polybasic saturated dicarboxylic acids with unsaturated alcohols have previously been suggested for the production of resin impregnated paper. In particular, diallyl esters of the various phthalic acids, such as diallyl phthalate, have been successfully employed. These synthetic resins possess certain important advantages for the intended purpose. For example, the polymerization resins can be hardened without liberation or splitting off of volatile components. Further, in order to apply such resin impregnated carriers to a base, only relatively small pressures are required and the completely cured product is free from tension and has high flexibility. Furthermore, due to their considerable hydrophobic characteristics, these resins exhibit superior resistance to fluctuating atmospheric conditions so that the final product can be used out doors without deterioration.

Thus, as explained hereinabove, both formaldehyde condensation resins and curable polymerization resins have advantages and characteristics which make them suitable as impregnating agents for the production of resin impregnated paper.

However, both the polycondensation resins as well as the polymerization resins have also a number of drawbacks which seriously affect their utility as impregnating agents for the production of resin impregnated paper films. These disadvantages are in part so serious that in many instances one or both of the groups cannot be employed for the intended purpose.

Thus, for example, aminoplast resin paper films, with a view to yielding smooth and satisfactory surfaces, have to be subjected to relatively high minimum pressures which have been determined to be at a magnitude of about 15 to 20 kg./cm.$^2$. As many base plates, such as thin boards or panels, do not withstand such a relatively high pressure, the surface improvement of many base materials by such aminoplast resin films is not feasible. Further, the degree of cross-linking of the aminoplasts is considerable, particularly at low molecular weights and these resins are therefore relatively brittle so that the final product tends to crack and form surface fissures. An additional disadvantage of the aminoplast resins for the intended purpose is that due to the fact that the final product always contains a certain moiety of hydrophilic groups, the final cured product is not sufficiently resistant to weather fluctuations. Combined with the brittleness of the product, this characteristic renders the use of aminoplast resin impregnated paper undesirable for many purposes.

The polymerization resins previously referred to do not have the defects enumerated in connection with the aminoplasts. However, these polymerization resins have, in turn, the important disadvantage that they have a very poor affinity to cellulose. For this reason, these polymerization resins do not satisfactorily wet the cellulose fibers of the paper carrier and this holds true whether or not the resin is applied to the carrier from an aqueous dispersion, from a solution in an organic solvent, of from a solution in its own monomer. The poor wettability of the cellulose fibers by the polymerization resins causes serious disadvantages for the following reasons. As is known, resin layers including hydrophobic ones permit to a small extent the penetration and passage of water. As, due to the poor wetting of the cellulose fibers, the fibers are not fully enveloped and thus are open to attack by water, water penetrating through the resin impregnation reaches the cellulose fibers and causes swelling phenomena in the compressed film which, in turn, of course, seriously impairs the characteristics and usefulness of the product. In addition, final curing of the resin is customarily accomplished in the presence of peroxide catalysts and these catalysts oftentimes negatively affect the paper carrier, as for example by discolorization, decomposition of the dyes in the paper and the like.

Accordingly, it is a primary object of this invention to produce resin impregnated paper which combines the advantages of resin impregnated paper impregnated with formaldehyde condensation resins or polymerization resins, but which is devoid of the defects and disadvantages inherent in the use of these two groups of resins.

Another object of this invention is to provide a novel resin impregnated paper film which has superior qualities, exhibits high resistance to weather fluctuations and can be prepared in a simple and inexpensive manner.

It is also an object of this invention to provide a process for the production of such novel superior resin impregnated paper films.

Generally, it is an object of this invention to improve on the art of producing resin impregnated paper.

Briefly, and in accordance with our invention, we have ascertained that resin impregnated carriers, and in particular resin impregnated papers of excellent and superior quality are obtained by first impregnating the paper with an insufficient amount of a hardenable formaldehyde condensation resin and thereafter, after drying, further impregnating the partially impregnated paper with an additional amount of a partially polymerized still curable polymerization resin. The term "partially polymerized" as used in this context, is deemed to refer to a product which has been polymerized to a predetermined extent and which can be further polymerized and finally cured at a later time. The term "insufficient amount" as used herein is deemed to refer to an amount of formaldehyde condensation resin which is insufficient completely to impregnate the paper and to produce a resin impregnated paper product of desired characteristics.

We have found that aminoplast resins are particularly suitable for the first impregnation step, while the second impregnation may be successively carried out with a partially polymerized polydiallyl phthalate resin.

Chemists skilled in the art will be surprised by the inventive procedure, that is, the successive impregnation of the paper with first a formaldehyde condensation resin and thereafter a polymerization resin. This is so because formaldehyde condensation resins, and in particular non-etherified aminoplast resins as they are usually employed for the impregnation of paper, are not generally compatible and cannot generally be combined with other synthetic resins of a group different from formaldehyde condensation resins. However, we have conclusively established that our inventive process can be successfully carried out and the beneficial characteristics of formaldehyde condensation resins and polymerization resins advantageously combined, provided the following two steps are carefully observed.

(1) The amount of formaldehyde condensation resin used for the first impregnation step should be sufficiently large so that the individual paper fibers are properly enveloped. Due to the well known affinity between cellulose and formaldehyde resin, the fibers can then no longer be attacked from the outside and are thus hermetically closed against extraneous influences. On the other hand, however, the amount of formaldehyde condensation resin should not be so great that the porosity of the paper is impaired to an extent at which penetration and anchoring of the subsequently applied polymerization resin is prevented. In other words, a balance has to be struck between a minimum amount sufficient to envelop the paper fibers and a maximum amount which would clog the pores of the paper web, thereby preventing penetration of the polymerization resin to be applied thereafter. Our experiments have shown that the specific amount of formaldehyde condensation resin to be used is dependent on the characteristics of the paper carrier. From a practical point of view, we found that the first impregnation of the paper carrier with the formaldehyde condensation resin gives excellent results if between about 2 to 50% by weight of resin calculated on the weight of the paper are lodged on and within the paper structure. We obtained optimum results with 10 to 33% by weight of formaldehyde condensation resin, calculated on the weight of the untreated paper.

(2) The second factor to be considered is that the formaldehyde condensation resin used for the first impregnation step and at the time of the final curing of the film should liberate or split off only insignificant amounts of volatile components, that is water and formaldehyde. This is so because if larger amounts of volatile components would be liberated and escape, they would exert unfavorable influence on the final polymerization of the polymerization resin and thereby might impair the appearance of the surface of the product. For this reason, we prefer to use formaldehyde condensation resins which contain a relatively low formaldehyde content. In the event that melamine resins are used, then the mole ratio between melamine to formaldehyde should preferably be about 1:1.5 to 2. Further, in order to minimize the amount of volatile components to be liberated during the final curing, the formaldehyde condensation resin applied to the carrier during the first impregnation should be dried or further condensed to a considerable extent before the polymerization resin impregnation is performed. In this manner, the major amount of volatile substances will escape during the drying or condensation procedure so that at the time of the final curing or hardening, only insignificant amounts of volatile components will be liberated.

The first impregnation step, that is, the impregnation with the formaldehyde condensation resin, is preferably carried out from an aqueous solution. Thus, as the amount of formaldehyde condensation resin to be applied to the carrier during the impregnation is important, as previously mentioned, it is recommended to adjust the concentration of the resin in the aqueous solution to a desired value. Thus, for example, the concentration of the solution may be lowered in a mixer before or after the condensation of the resin by the addition of suitable amounts of water. The drying of the formaldehyde condensation resin after application to the carrier may be accomplished in well known prior art manner, as for example, in hot air channels or by means of infrared radiation.

The impregnation with the polymerization resin may also be carried out in different ways. In this connection, reference is had to the several well known procedures for the production of polymerization resin impregnated papers. Thus, for example, a partially polymerized polymerizate may be dissolved in an organic solvent, for example a ketone, and this solution may then be applied to the carrier previously impregnated with the formaldehyde condensation resin. Instead of applying the polymerization resin in the form of an organic solvent solution, the polymerization resin may be employed in the form of an aqueous dispersion or in the form of a solution of the partially polymerized product in its own monomer or even in a different monomer. The subsequent drying and further polymerization after the impregnation with the polymerization resin is also carried out in well known manner in driers or between heated rollers and the like, preferably under exclusion of air.

The further processing of the twice impregnated paper carrier may then be performed in the same manner as is known from the further processing of prior art polymerization resin impregnated carriers. Thus, for example, the product may be bonded to a base plate and finally cured by pressing the impregnated carrier against the base under application of heat and pressure, as for example 3 to 10 kg./cm.². It is, of course, also possible to form a laminated structure of several superimposed resin impregnated carriers and to perform the final curing or hardening thereafter.

The end product obtained in accordance with the inventive procedure possesses the important advantages of paper films which solely have been impregnated with polymerization resins, with regard to flexibility and resistance to weather fluctuations. Further, in the event that the products are subjected to the action of hot water or steam, no swelling of the paper fibers takes place, as the fibers are completely imbedded in the formaldehyde condensation resin, and any water absorption is insignificant from a practical point of view.

Thus, for example, we performed the following experiment for the purpose of demonstrating resistance to water. As control, a paper was directly impregnated with diallyl phthalate. Four such impregnated papers were superimposed on each other and were compressed into a laminate. The laminate was then boiled in water, and after two hours of boiling the laminate had absorbed an amount of water corresponding to 5% of its weight. By contrast, a laminate which had been produced from four layers prepared in accordance with the inventive twin procedure absorbed only 0.45% of water after having been subjected to water boiling for two hours.

In this connection it should also be mentioned that due to the enveloping of the paper fibers by the formaldehyde condensation resin, the peroxidic hardening catalysts, which are usually contained in the polymerization resin in significant amounts, do not affect the paper. No yellowing of white paper or discoloration of organically dyed paper could be observed in resin impregnated paper products prepared in accordance with this invention.

The invention will now be described by several examples, it being understood, however, that these examples are given by way of illustration and not by way of limitation, and that many changes in process conditions, choice of raw materials, etc. may be effected without in any way affecting the scope and spirit of this invention as recited in the appended claims.

EXAMPLE I

The carrier in this test was a pigmented white unglued α-cellulose paper having a suction height of 30 to 35 mm. per 10 minutes, measured in the longitudinal direction. The weight of the paper was 150 g./m.². The first impregnation step was performed with an aqueous solution of a melamine resin which, with a mole ratio of melamine to formaldehyde of 1:1.5, had been condensed in the usual manner in a weakly alkaline medium. The paper was soaked in the aqueous melamine resin solution and dried at 130° C. so that the impregnated paper product had a volatile content of 2% and a final weight of 190 g./m.². The volatile content was measured by drying for 10 minutes at 160° C. in a drying oven with agitated air flow. The impregnated paper was thereafter soaked with diallyl phthalate resin. This diallyl phthalate resin had previously, in customary manner, been partially polymerized in the presence of radical forming catalysts to a polymerization degree of 25%. In other words, the diallyl phthalate resin mixture used as impregnating agent contained 25% by weight of a partially polymerized product dissolved in monomers. This partially polymerized solution prior to the impregnation was admixed with an additional 1% of benzoyl peroxide and 2% of tertiary butylperbenzoate. After the second impregnating procedure, the impregnated paper product thus obtained was treated for two minutes in a heating chamber at a temperature of 135° C. under exclusion of air. For this purpose, a so-called AUMA machine (trademark) was used. This after treatment yielded a resin impregnated non-sticky film which could be stored for extended periods of time. The film had a weight of 350 g./m.².

The film was thereafter bonded to a base such as a plywood plate. The bonding was effected by pressing the film against the base plate for 15 minutes at a temperature of 160° C. and a pressure of about 5 kg./cm.². The application of the film to the plywood plate resulted in a glossy smooth surface of superior mechanical, chemical and thermal characteristics as previously mentioned.

In order to test the characteristics of the final product, four layers of film of the kind indicated were placed one upon the other and compressed into a laminate. The laminate was thereafter cut into a square plate of a size of 10 x 10 cm. As control, a laminate plate was used which had been produced from the same type of paper but which had been impregnated with diallyl phthalate resin only, i.e. no melamine resin impregnation was effected. Both samples were immersed in cold water for sixty hours, whereafter the following results could be determined: The control plate showed considerable swelling and the paper was visible at the surface of the laminate. After drying for several hours, the swelling receded.

By contrast, the sample prepared in accordance with the inventive procedure did not exhibit any changes at the surface.

Quantitative tests for the water resistance were performed in the following manner: The test sample was boiled in a small amount of water for about two hours and was thereafter cooled in water. Water adhering to the surface was removed. Thereafter, the test sample was weighed. The test sample was then dried for several hours at 50° C. and the final weight was thereafter determined in order to ascertain whether the weight had decreased. The results of this test are tabulated in the following table:

*Weight increase of the test samples*

|  | Percent | | |
|---|---|---|---|
| Test sample without melamine resin impregnation | 4.8 | 5.1 | 4.75 |
| Test sample with melamine resin impregnation | 0.45 | 0.50 | 0.52 |

Weight reduction caused by the water treatment could not be ascertained.

EXAMPLE II

This test was carried out with a pigmented unglued α-cellulose paper having a suction height of 50 mm. per 10 minutes, measured in the longitudinal direction. The weight of the paper was 170 g./m.². The paper was soaked with an aqueous solution of a melamine resin and was thereafter dried at 130° C. so as to obtain a volatile content of 2.2% and a final weight of 230 g./m.². The mole ratio of melamine to formaldehyde in the melamine resin was 1:2 and the resin had been condensed in the usual manner.

The thus pre-impregnated paper was thereafter impregnated with a solution of a partially polymerized diallyl phthalate in acetone. The solution contained additionally 2% of tertiary butylperbenzoate. After the impregnation, the coated carrier was dried. The weight of the film thus obtained was 380 g./m.². Four such films were superimposed and were compressed into a laminate at a pressure of 10 kg./cm.² and at a temperature of 155° C. The pressing time was 15 minutes. The laminate obtained was thereafter tested in the same manner as described in connection with Example I.

Immersion in cold water for sixty hours gave the following results:

Significant swelling could be observed in the control sample and the carrier paper was visible at the surface. The swelling slowly receded after several hours of drying.

By contrast, the laminate as prepared in accordance with this example did not exhibit any change on the surface.

A quantitative examination yielded the following results:

*Weight increase of the test samples*

|  | Percent | | |
| --- | --- | --- | --- |
| Test sample without melamine resin impregnation | 5.2 | 5.8 | 5.3 |
| Test sample with melamine resin impregnation | 0.5 | 0.5 | 0.4 |

Weight reduction after drying could not be ascertained.

EXAMPLE III

This test was carried out with an unglued α-cellulose paper which had been colored with pigments. The suction height of the paper was 25 to 30 mm. per 10 minutes, measured in the longitudinal direction, while the weight of the paper was 120 g./m.$^2$. The impregnation was carried out with an urea resin which had been condensed in the customary manner with formaldehyde, the mole ratio of urea to formaldehyde being 1:1.1. 0.2% of ammonium thiocyanate were added to the resin as a hardener. The impregnation was carried out in such a manner that after drying at 110° C. the impregnated product had a volatile content of 1.8% and a final weight of 150 g./m.$^2$. The thus treated paper was thereafter further impregnated with a 55% aqueous dispersion of a partially polymerized diallyl phthalate polymerizate. The diallyl phthalate polymerizate was prepared in accordance with the teachings of German patent application G 30,788 IVb/39c which corresponds to U.S. Patent No. 3,131,088. The drying of the impregnated product was thereafter performed in a hot air chamber for three minutes at a temperature of 130° C. The final weight of the film thus obtained was 300 g./m.$^2$.

The film obtained was thereafter laminated into a four layer laminate as described in the preceding examples, and the test sample thus obtained was subjected to water resistance tests as previously explained. The results of this test were as follows:

*Weight increase of the test samples*

|  | Percent | | |
| --- | --- | --- | --- |
| Test sample without urea resin impregnation | 3.8 | 3.3 |  |
| Test sample with urea resin impregnation | 0.7 | 0.6 | 0.8 |

Weight loss upon drying could not be ascertained.

While specific embodiments of the invention have been shown and described in detail to illustrate the application of the inventive principles, it will be realized that the invention may be embodied otherwise without departing from such principles.

What is claimed is:

1. A process of preparing curable resin impregnated carriers which comprises impregnating a porous cellulose carrier web with a first amount of a curable aminoplast condensation resin insufficient completely to fill the pores of said carrier, thereafter impregnating the thus impregnated carrier web with a second amount of a partially polymerized polymerization resin being a partially polymerized polymerizate of esters of saturated polybasic carboxylic acids with unsaturated alcohols and drying the product thus obtained to an incompletely cured state.

2. A process of preparing curable resin impregnated paper films which comprises impregnating paper with a first amount of a curable aminoplast condensation resin, said amount being sufficient to envelop the paper fibers but being insufficient completely to clog the pores of the paper, thereafter drying the thus impregnated paper to a state wherein the resin is still incompletely cured, then further impregnating the impregnated paper with a second amount of a partially polymerized polymerization resin being a partially polymerized polymerizate of esters of saturated polybasic carboxylic acids with unsaturated alcohols and thereafter drying the product thus obtained to an incompletely cured state.

3. A process as claimed in claim 2, wherein said first amount of aminoplast condensation resin applied to said paper is about between 2 to 50% by weight, calculated on the weight of the paper.

4. A process as claimed in claim 2, wherein said first amount of aminoplast condensation resin applied to said paper is about between 10 to 33% by weight, calculated on the weight of the paper.

5. A process as claimed in claim 2, wherein the aminoplast condensation resin is a formaldehydemelamine resin.

6. A process as claimed in claim 2, wherein the aminoplast condensation resin has a low content of volatile components.

7. A process as claimed in claim 2, wherein the aminoplast condensation resin is a melamine formaldehyde condensation resin having a mole ratio of melamine to formaldehyde of about 1 to 1.5–2.

8. A process as claimed in claim 2, wherein said polymerizate is a diallyl phthalate polymerizate.

9. A process as in claim 2, wherein said drying of the paper after impregnation with said aminoplast condensation resin is continued until the major portion of volatile components in said resin has escaped.

10. A process of preparing curable resin impregnated paper films suitable as surface coatings and suitable for the production of laminated products, comprising impregnating paper with an amount of aminoplast condsensation resin sufficient to envelop the fibers of the paper but insufficient completely to clog the pores of the paper, drying the impregnated product to an incompletely condensed stated and to a state wherein the major portion of volatile components in the resin has escaped, then further impregnating the dried paper product with a partially polymerized polymerization resin being a partially polymerized polymerizate of esters of saturated polybasic carboxylic acids with unsaturated alcohols in an amount sufficient completely to clog the pores of the paper and to impart desired finish chracteristics to the paper and thereafter drying the product thus obtained to an incompletely cured state.

11. A process as claimed in claim 10, wherein the aminoplast condensation resin is a melamine formaldehyde resin and is applied to the carrier from an aqueous solution.

12. A process of preparing curable resin impregnated paper films, which comprises impregnating paper witth about 2 to 50% by weight, calculated on the weight of the paper, of an aminoplast condensation resin selected from the group consisting of urea formaldehyde condensation resins and melamine formaldehyde condensation resins, thereafter drying the impregnated product until an incompletely condensed product has been obtained and the major portion of the volatile components of the resin has escaped, then further impregnating the dried product with partially polymerized diallyl phthalate in an amount sufficient to fill the pores of the paper and to form a surface layer on the paper product, and thereafter further polymerizing and drying the product to a non-sticky incompletely cured state.

13. Resin impregnated paper films obtained according to the process of claim 2.

References Cited by the Examiner

UNITED STATES PATENTS 2,964,426  12/60  Holtschmidt _____ 117—76 X

WILLIAM D. MARTIN, *Primary Examiner.*

RICHARD D. NEVIUS, *Examiner.*